US007636945B2

(12) United States Patent
Chandnani et al.

(10) Patent No.: US 7,636,945 B2
(45) Date of Patent: Dec. 22, 2009

(54) DETECTION OF POLYMORPHIC SCRIPT LANGUAGE VIRUSES BY DATA DRIVEN LEXICAL ANALYSIS

(75) Inventors: Anjali Chandnani, Brunswick West (AU); Trevor Yann, Rowville (AU)

(73) Assignee: Computer Associates Think, Inc., Islandia, NY (US)

( * ) Notice: Subject to any disclaimer, the term of this patent is extended or adjusted under 35 U.S.C. 154(b) by 1231 days.

(21) Appl. No.: 09/905,343

(22) Filed: Jul. 14, 2001

(65) Prior Publication Data

US 2002/0073330 A1 Jun. 13, 2002

Related U.S. Application Data

(60) Provisional application No. 60/218,313, filed on Jul. 14, 2000.

(51) Int. Cl.
G06F 11/00 (2006.01)
G06F 12/14 (2006.01)
G06F 9/45 (2006.01)

(52) U.S. Cl. .......................... 726/24; 713/188; 717/142

(58) Field of Classification Search ................ 713/187, 713/188, 200; 726/24; 717/142
See application file for complete search history.

(56) References Cited

U.S. PATENT DOCUMENTS

| 5,737,608 | A | * | 4/1998 | Van De Vanter | ............. 717/112 |
| 5,799,268 | A | * | 8/1998 | Boguraev | ....................... 704/9 |
| 5,826,013 | A | * | 10/1998 | Nachenberg | ................ 713/200 |
| 5,831,853 | A | * | 11/1998 | Bobrow et al. | ................ 700/86 |
| 5,881,151 | A | * | 3/1999 | Yamamoto | .................... 726/24 |
| 5,907,834 | A | * | 5/1999 | Kephart et al. | ................ 706/20 |
| 5,978,917 | A | * | 11/1999 | Chi | ............................. 726/22 |
| 6,269,447 | B1 | * | 7/2001 | Maloney et al. | ............. 713/201 |
| 6,324,650 | B1 | * | 11/2001 | Ogilvie | .......................... 726/2 |
| 6,357,008 | B1 | * | 3/2002 | Nachenberg | ................ 713/200 |
| 6,418,444 | B1 | * | 7/2002 | Raduchel et al. | ......... 707/103 Z |
| 6,609,205 | B1 | * | 8/2003 | Bernhard et al. | .............. 726/22 |
| 6,711,583 | B2 | * | 3/2004 | Chess et al. | ............. 707/104.1 |
| 6,721,721 | B1 | * | 4/2004 | Bates et al. | ..................... 707/1 |
| 7,069,583 | B2 | | 6/2006 | Yann et al. | ...................... 726/4 |
| 7,069,589 | B2 | | 6/2006 | Schmall et al. | ............... 726/24 |
| 7,210,040 | B2 | | 4/2007 | Jordan | ........................ 713/187 |
| 7,350,235 | B2 | | 3/2008 | Jordan | ........................ 726/24 |
| 2002/0078368 | A1 | * | 6/2002 | Yann et al. | .................. 713/200 |
| 2002/0083334 | A1 | | 6/2002 | Rogers et al. | .................. 726/3 |

OTHER PUBLICATIONS

Fermoyle, Ken. Firm Offers Free Tool to Fight 'Love You' Virus. Jun. 2000. Ottawa PC User's Group.*

(Continued)

*Primary Examiner*—Michael Pyzocha
(74) *Attorney, Agent, or Firm*—Baker Botts L.L.P.

(57) ABSTRACT

A method and apparatus for detecting script language viruses is provided. The apparatus includes a script language processor, a detection data processor and a detection engine. The script language processor prepares language description data corresponding to at least one script language. The detection data processor prepares detection data for viral code corresponding to the script language virus. The detection engine lexically analyzes a data stream using the language description data and the detection data to detect the viral code. The language description data may correspond to language definition rules and language check rules. The data stream may be converted to a stream of tokens, wherein the lexical analysis is performed on the token stream. The script language virus detection apparatus may be a computer program stored on a computer readable medium and/or transmitted via a computer network or other transmission medium.

22 Claims, 7 Drawing Sheets

OTHER PUBLICATIONS

Edwards, Mark Joseph. Love Letter Virus- An Update. May 5, 2000. Windows IT Pro.*
Mail Marshal: Email Content Security. Revised Feb. 20, 2003. Essential Computing.*
Frame Technology. Types of Viruses. 1994.*
TheFreeDictionary.Com. Apr. 29, 2005. <http://computing-dictionary.thefreedictionary.com/lexical+analysis>.*

Session 19: Intro to Compiler Design: BNF, Recursion and Finite Automata. Fall 1999. Computer Science Cource CS373. Retrieved from www.whitworth.edu/academic/Department/MathComputerScience/Courses/CS373_1999_Fall/Session_19.doc.*

* cited by examiner

DETECTION OF POLYMORPHIC SCRIPT LANGUAGE VIRUSES BY DATA DRIVEN LEXICAL ANALYSIS

CROSS-REFERENCE TO RELATED APPLICATIONS

This application claims the benefit of provisional application Ser. No. 60/218,313, filed Jul. 14, 2000 and entitled "DETECTION OF POLYMORPHIC SCRIPT LANGUAGE VIRUSES BY DATA DRIVEN LEXICAL ANALYSIS."

TECHNICAL FIELD

This disclosure relates to the detection of script language viruses. In particular, the disclosure relates to the detection of polymorphic script language viruses by using data driven lexical analysis.

DESCRIPTION OF RELATED ART

Computer viruses are a major problem in modern day computing. Generally, a computer virus is a computer program or some unit of computer executable code, e.g., instructions to which a computer responds, such as a code block, code element or code segment. When the viral code is executed on a computing device, it typically attaches to other programs (or sets of computer instructions) or a file, and it also may replicate itself. In this way, the virus exists within and "infects" otherwise normal programs/files. Another typical objective of a computer virus is to perform unsolicited actions on a target computer, without the knowledge and authorization of the computer user, and thereby perform unwanted, and also possibly harmful, actions on components of the computer and/or information stored on the computer.

Some viral code may cause damage to an infected computer and/or information stored on the computer, or prevents the computer from being used in its normal manner. For example, some viruses alter or destroy data or program files stored on, for example, the hard drive of the infected computer, which typically results in considerable downtime for the computer. Additionally, in some instances the integrity of an organization's computer database(s) is attacked, and the organization, without notice of the data corruption, continues operation using inaccurate data. Even if corrupted data is detected, the organization often has to, upon discovery of the problem, take time to recover its database before it may continue its normal operation.

Frequently, the viral code resides in a file containing computer executable code comprising a collection of computer instructions. Each time the infected code runs on a computing device/system, the virus code has the opportunity to spread and do its damage on the device/system. For example, the virus may spread by adding itself to computer executable code in some other program on a computer, then changing the preexisting code in such a way that the newly added viral code may be executed to further replicate itself in yet another program. Infected programs can exist anywhere in the computer system or even the operating system itself, and if not detected can cause potentially devastating problems.

The virus also may spread from one computer file to another, and from one machine to another by attaching itself to a file or program in a removable storage medium, such as floppy disk, compact disc (CD), digital versatile disc (DVD), etc., that is accessible when the computer runs or accesses the infected file or program. If a user then places that infected medium into a second computer and the second computer runs or accesses the infected file or program, the virus will attempt to infect the second computer, and so forth. In addition, the virus may spread from one computing machine to another by attaching to data transmissions between the computer machines via a network or other transmission medium.

Personal computers and computer networks are not the only computing devices vulnerable to virus infections. Embedded control systems used in, for example, industrial process control settings for controlling machinery, motors, industrial robots and process data from sensors also are vulnerable.

Assorted techniques have been proposed to detect and/or foil viruses. Anti-virus programs may search for characteristic behaviors of viruses and remove any found virus. For example, a virus scanner program scans a file or set of files, such as executable files, application macro files, disk boot sectors, etc., for particular known viruses. Typically, the virus scanner program searches for known virus signatures or byte strings. A virus signature is a pattern of (not necessarily sequential) characters or instructions that is found in each instantiation of the associated virus.

Virus scanner programs generally are successful only at eliminating viruses that are known to the scanner program. Thus, while virus scanner programs may be able to detect some known viruses, which are identified in virus signature files, these programs generally would not be able to detect viruses with signatures not identified in the virus signature files. Consequently, a new virus may be able to damage a computer and/or information stored thereon, if the computer uses only a virus scanner program to combat viruses. New and more damaging computer viruses are introduced and spreading throughout the world in this Internet age virtually on a daily basis. Without frequent updates of the signature files, a virus scanner program may become obsolete within a very short time after installation. In addition, for the virus scanner program to detect a virus the virus likely already infected the computer. The virus might have done some damage or even replicated itself and spread before it is detected.

Other types of anti-virus techniques include a cyclical redundancy check (CRC). For each and every file to be protected, a unique CRC signature in the form of a 2-byte number derived from the contents of the subject file is generated and then stored in either the subject file itself or a separate file. At a later time, a CRC error checking program determines whether such files have been tampered with or otherwise become corrupted since the CRC signature was generated and stored, by generating a second CRC signature and then comparing the stored CRC signature with the second CRC signature. If the two signatures do not match then the information/data in the subject file is deemed to be corrupted. CRC programs have the disadvantage that they are easy to identify and thus easily tricked into generating a CRC signature for the infected file that is identical to the stored CRC signature.

A virus is "polymorphic" if it copies itself differently to change its signature and make itself appear different each time it spreads. For example, garbage code may be inserted along with the virus in the file to which it is copied, or the order of code execution of the virus is changed. Typically, the functionality of the virus remains the same but the actual code is different. Thus, polymorphic viruses can escape detection by signature scanning or CRC methods.

A computer script is a group of commands usually stored in a file and run one at a time. Scripts are regularly used by computer administrators and programmers so that the commands do not have to be typed one at a time. Since the group of commands in a script typically is run periodically and/or more than once, such as each time the computer is turned on or restarted, the savings in time, as compared to typing the command lines one at a time each time it is used, is significant. The advantages of scripts have motivated the proliferation of languages, such as VBScript (Visual Basic Script) and JavaScript specifically designed for expressing computer scripts. A script language virus is written using a script language and targeted at scripts expressed in the same script language.

Current systems for detecting script language viruses comprise matching a predefined virus signature and/or using a CRC check, such as by comparing a CRC signature of the subject file with the expected CRC signature of the subject file infected with a known script language virus. Many script language viruses are polymorphic. For example, script language viruses targeted at scripts written in VBScript, which is a case-insensitive script language, can copy themselves with a sprinkling of upper-case and lower-case letters such that each copy is different. As a result, a signature match between the predefined signature of the script language virus and the copy, as well as a comparison between the expected CRC signature of a file infected with the script language virus and a CRC signature of the file infected instead with the copy, likely would fail and therefore the virus would not be detected.

SUMMARY

The disclosure provides a method of detecting a script language virus. In one embodiment, the method includes preparing language description data corresponding to at least one script language, preparing detection data for viral code corresponding to the script language virus, and lexically analyzing a data stream using the language description data and the detection data to detect the viral code.

The method further may include obtaining samples of the viral code, analyzing the samples, and setting a detection regimen including at least one pattern match and/or cyclical redundancy check based on the analysis.

The disclosure also provides an apparatus for detecting a script language virus. In one embodiment, the apparatus includes a script language processor, a detection data processor and a detection engine. The script language processor prepares language description data corresponding to at least one script language. The detection data processor prepares detection data for viral code corresponding to a script language virus. The detection engine lexically analyzes a data stream using the language description data and the detection data to detect the viral code.

The language description data, in accordance with one embodiment, correspond to language definition rules and language check rules. The lexical analysis may include one or more pattern matches based on the language definition rules. A script language used by the data stream may be determined by lexical analysis using the language check rules.

The language description data, in accordance with another embodiment, correspond to Dynamic Finite Automata. The Dynamic Finite Automata includes a set of states, with each state having a corresponding set of transitions and each transition having an associated construct to be matched and an associated next state.

The detection data includes at least one test, each of the at least one test correspond to a pattern match or a cyclical redundancy check.

The data stream may be converted to a stream of tokens using lexical analysis. The tokens may correspond to respective language constructs. Further lexical analysis may be performed on the stream of tokens, or the stream of tokens may be CRC checked for positive detection.

BRIEF DESCRIPTION OF THE DRAWINGS

The features of the present disclosure can be more readily understood from the following detailed description with reference to the accompanying drawings wherein.

DETAILED DESCRIPTION

This disclosure provides tools (in the form of apparatus, systems and methods) for detecting script language viruses by performing a lexical analysis of a data stream on a computing device/system. The data stream may be generated from a potentially infected file ("subject file"). The subject file may be stored on a storage medium, such as hard disk or floppy disk, or received via a network, such as the Internet, or a wired or wireless transmission medium, such as telephone landlines or RF airwaves.

Figure 1:
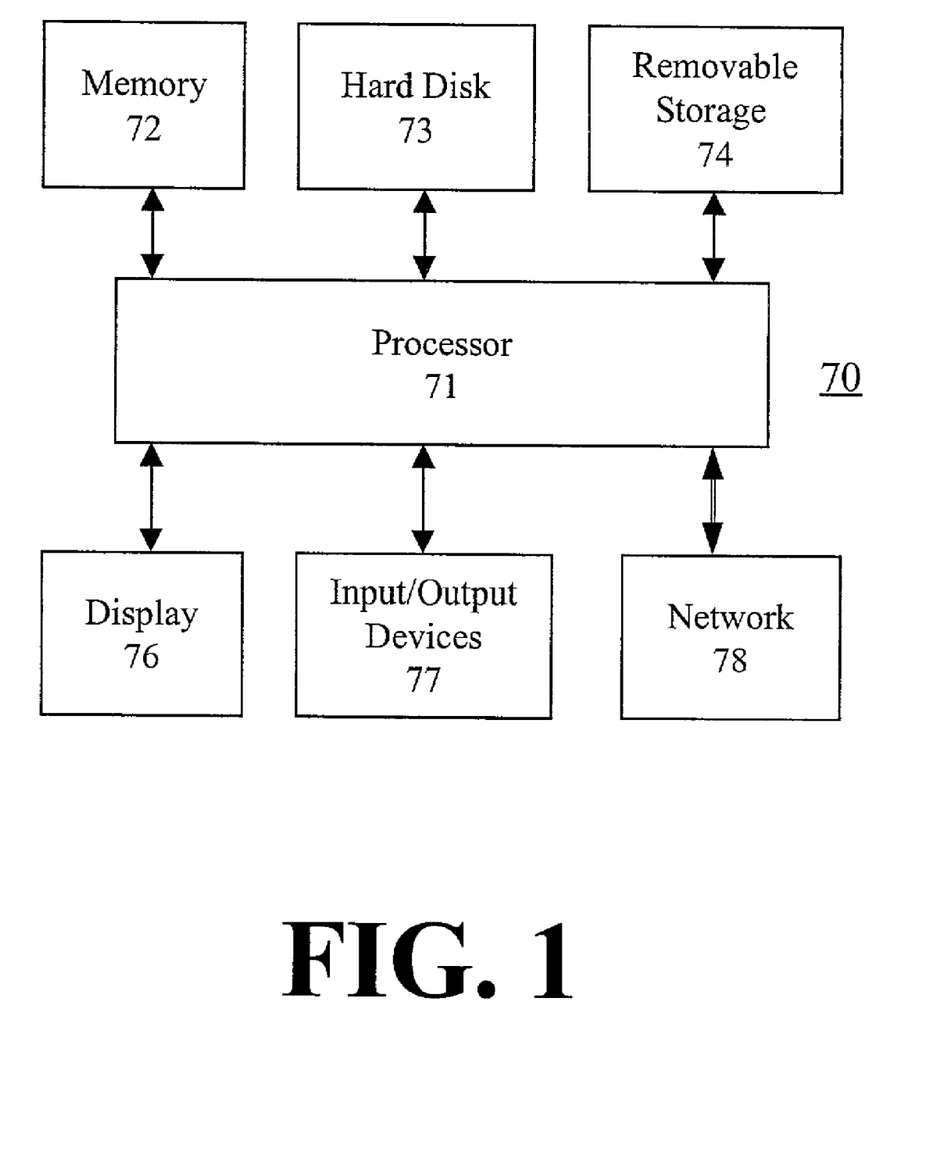
FIG. 1 shows a block diagram of a typical computing system/device that may be a target of a computer virus.

FIG. 1 illustrates a computer system or computer 70 on which a potentially infected file may execute and/or reside (and which thus may be a target of a script language virus). Computer system 70 comprises a processor 71, memory 72, hard disk 73, removable storage drive 74 (for reading/accessing removable storage media, such as floppy disks, CDs, DVDs, etc.), display 76, I/O devices 77 (for example, keyboard, mouse, microphone, speaker, etc.), and a wired or wireless connection to a network 78. The network can be, for example, a LAN, a WAN, an intranet, an extranet, the Internet, and/or any combinations of such networks. Computer 70 may be any of the computing devices/systems known in the art, such as, for example, a personal computer, a laptop, a workstation computer, a mainframe computer, a personal digital assistant (PDA), etc. (also referred to herein either separately or collectively as "computing device", "computer", "computer system" or "computing system").

A potentially infected file (i.e., a subject file) may reside on/in, for example, hard disk 73 and/or a removable storage medium that may be read/accessed through removable storage drive 74. Also, a subject file may be downloaded to the computer system or computer through network 78.

Figure 2:
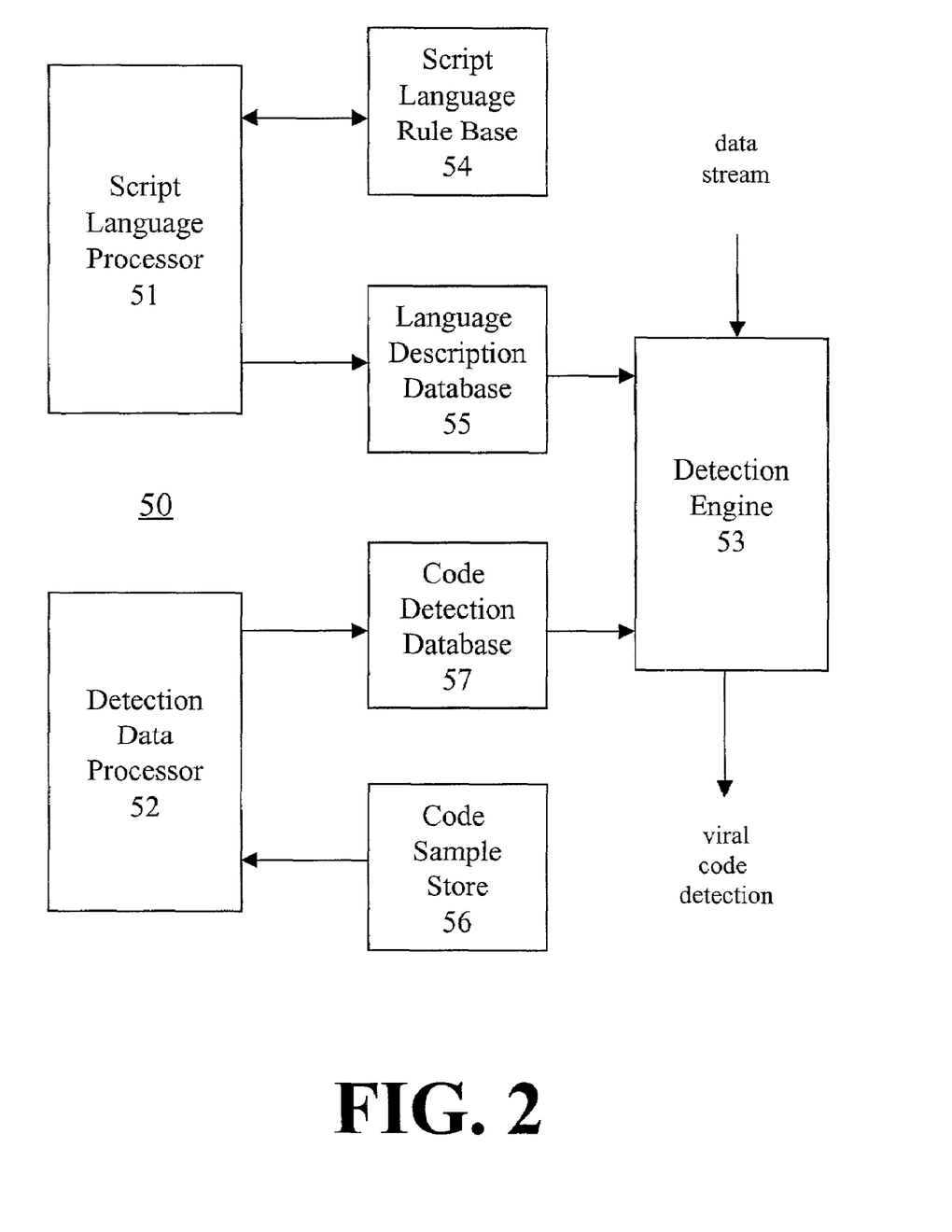
FIG. 2 shows a block diagram of a script language virus detection apparatus, in accordance with an embodiment of the present disclosure.
Figure 3:
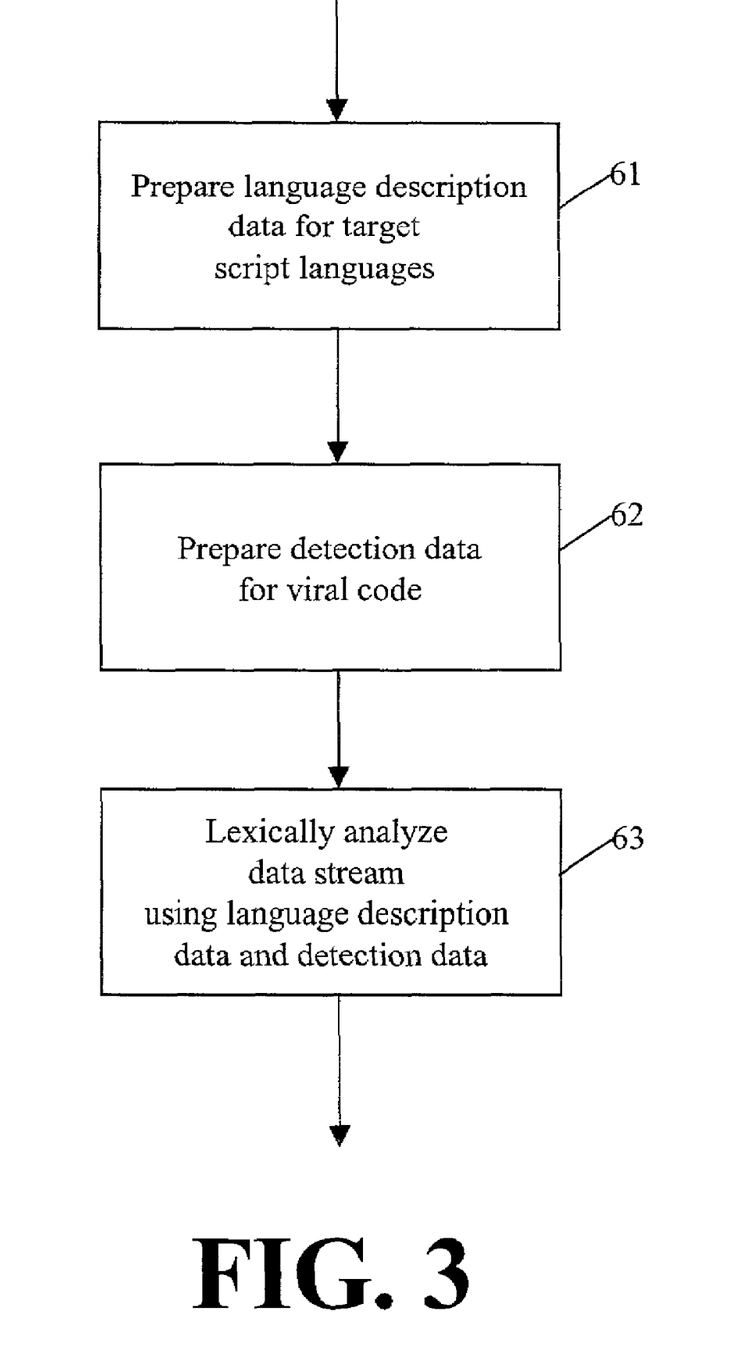
FIG. 3 shows a flow chart of a method of detecting a script language virus, in accordance with an embodiment of the present disclosure.

An apparatus 50 for script language virus detection, in accordance with one embodiment shown in FIG. 2, comprises script language processor 51, detection data processor 52 and detection engine 53. A methodology for detecting polymorphic script language viruses in accordance with an embodiment of the present disclosure will be described with reference to FIGS. 2 and 3. In this exemplary embodiment, language description data corresponding to one or more script languages is prepared by script language processor 51 (step 61). Viral code detection data is prepared by detection data processor 52 for one or more script language viruses (step 62). A data stream is lexically analyzed by detection engine 53 using the language description data and the detection data to detect viral code (step 63).

Preparation of Language Description Data

The present disclosure provides for detecting script language viruses by lexical analysis. Before the analysis is commenced, target script languages, including their constituent parts, which may be used by the script language viruses, are identified/defined. The constituent parts/constructs of a target script language include, for example, operator symbols (e.g., "+", "=", etc.), identifiers (e.g., "x1", "y2", etc.), delimiters (e.g., "{ . . . }", "BEGIN . . . END", etc.), keywords (e.g., "IF . . . THEN", "GOTO", etc.), numbers, blank spaces, etc.

Definitions of target script languages, in accordance with one embodiment, can be in a rule-based form. For example, the definitions of target script languages may include language definition rules and possibly language check rules. Language definition rules for a target script language describe the constructs of the target script language and any relations between the constructs (e.g., in relation R1 construct c1 is followed by construct c2). Language check rules, which define characteristics of the target script languages, differentiate one language (or group of languages) from another language (or group of languages). In the embodiment described below, the target script languages are defined by language definition rules and language check rules.

After the target script languages are defined in the language definition rules and language check rules, language description data for the target script languages is prepared. The language description data may include language definition data as well as language check data.

Figure 4:
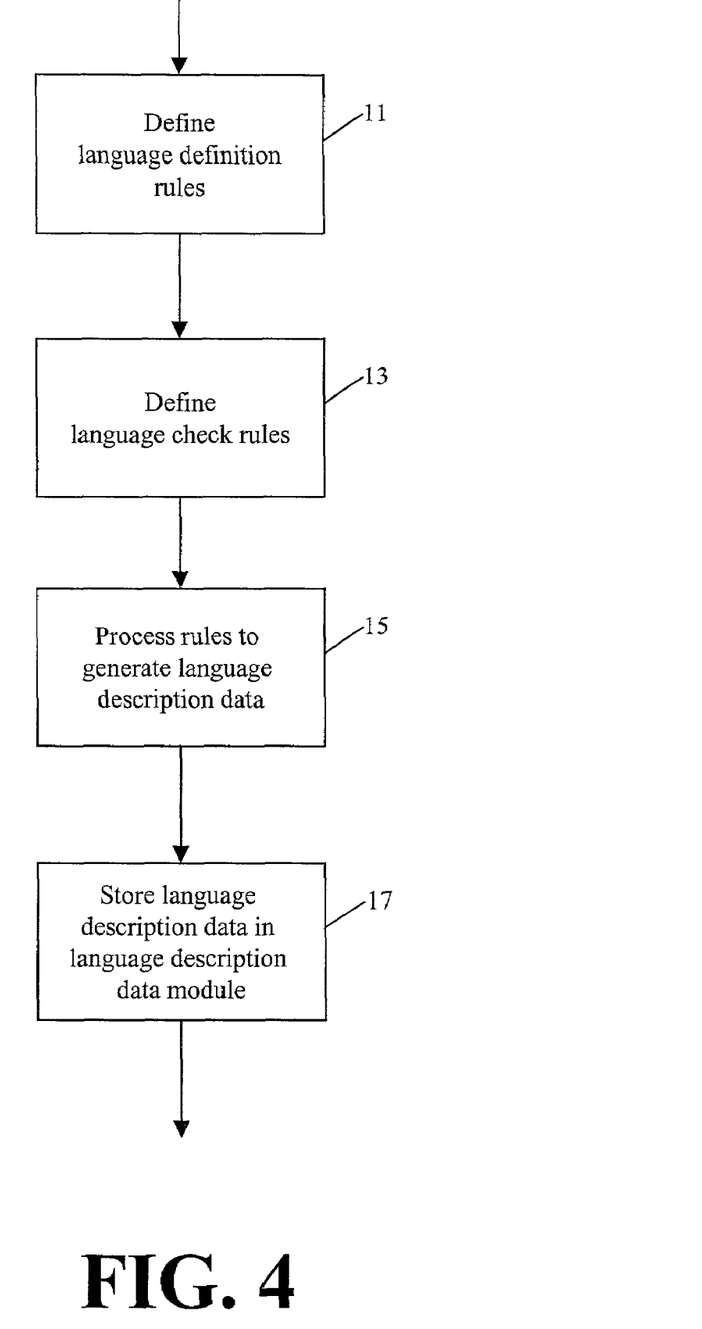
FIG. 4 shows a flow chart of a process for generating language description data for target script languages, in accordance with an embodiment of the present disclosure.

An exemplary process for generating language description data for target script languages will be described with reference to FIGS. 2 and 4. Sets of language definition rules are defined for the respective target script languages and stored in rule base 54 (step 11). Language check rules are defined and also stored in rule base 54 (step 13). Next, the language definition rules and language check rules are processed by script language processor 51 to generate language description data for the respective target script languages (step 15). The language description data for the target script languages are stored in the language description data module 55 (step 17).

The language definition rules for a target script language, in accordance with an embodiment of the present disclosure, may be a set of grammar rules for the script language which describe, amongst other things, language syntax. A script language, like most languages, has a corresponding set of grammar rules and may be analyzed sequentially. For example, the three letters "a", "c", "t" may be arranged in different sequences (e.g., a-c-t versus c-a-t) corresponding to words having very different meanings. As another example, the three words "Billy", "cheated" and "Bob" may be arranged in different orders (e.g., "Billy cheated Bob"; "Bob cheated Billy"; "Billy Bob cheated") to form sentences having very different meanings.

The grammar rules may be defined using, for example, Boolean expressions, in which each expression specifies a pattern for matching language constructs. Thus, each script language definition may be a corresponding set of pattern matching rules. Each rule may have a corresponding unique identification number, which is generated as a token when the pattern represented by the grammar rule is matched. Some grammar rules may not be assigned an identification number, since not all language constructs pertain to polymorphic script language virus. When such rules are invoked, no token is generated. It should be noted that variable names or other user defined identifiers, which can change between copies of polymorphic viral code and between different strains of the same viral family, may be ignored for detection purposes.

The following is an example of a grammar rule, as a series of operations, for parsing a IF-THEN conditional statement in a hypothetical script language:

(1) search for the keyword "IF";
(2) search for the first instance of the keyword "THEN" after the instance of "IF" found in (1);
(3) store the expression between the keyword "IF" found in (1) and the keyword "THEN" found in (2), as an expression to be parsed;
(4) search for a statement terminator after the keyword "THEN" found in (2); and
(5) store the expression between the keyword "THEN" found in (2) and the statement terminator found in (4), as an expression to be parsed.

After the language definition rules and possibly language check rules are defined, the rules are processed (e.g., converted) to generate language description data, which preferably is in a binary format (step 15). The language description data for a target script language is a representation of the language definition rules and the language check rules (if defined) sufficient for the detection engine 53 to lexically analyze and parse a data stream. In accordance with one embodiment, the language description data includes Dynamic Finite Automata (DFA) data corresponding to the target script language.

The DFA data for a target script language may correspond to pattern match rules and include a set of states. Each state corresponds to a stage in the pattern match operations and includes a corresponding set of possible transitions from the state, and each transition from the state includes a character (or string of characters) to be matched and a corresponding next state to transition to if the character/string is matched (collectively forming a so-called "state transition table"). A state that is the final state for a pattern match also has an output token which indicates that the corresponding pattern has been matched. The DFA data may be stored in a concise binary format in a DFA data module.

Preparation of Viral Code Detection Data

Figure 5:
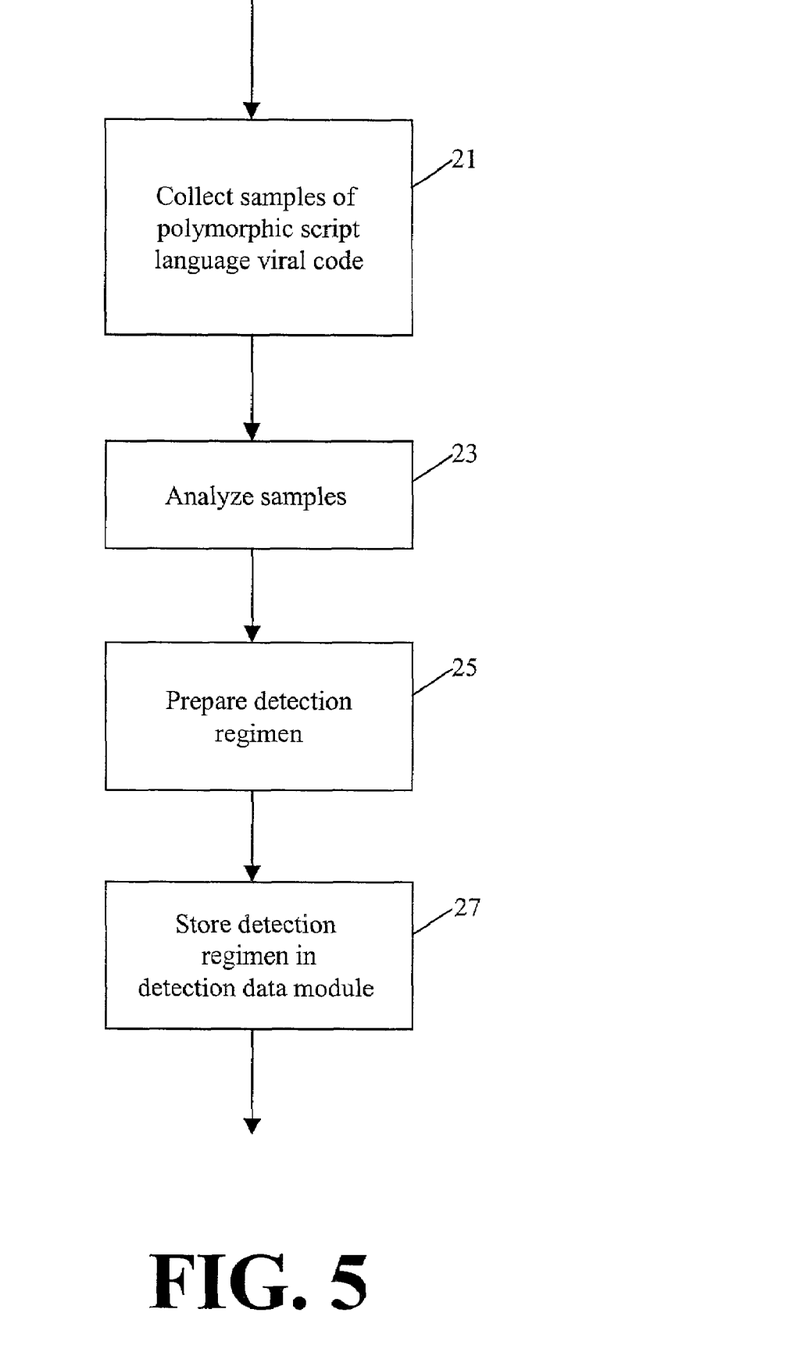
FIG. 5 shows a flow chart of a process for preparing viral code detection data, in accordance with an embodiment of the present disclosure.

The second step of the above-described three step methodology involves the preparation of viral code detection data. Referring to FIGS. 2 and 5, samples of polymorphic script language viral code (which have been collected over time) stored in code sample store 56 are converted to viral code detection data by detection data processor 52. The detection data for sample viral codes may be stored as respective entries in code detection module 57.

An exemplary process for preparing viral code detection data to be stored in the code detection module 57 will be described. Samples of polymorphic script language viral code are collected (over time) and stored in code sample store 56 (step 21). The samples are then analyzed by detection data processor 52 (step 23). A detection regimen including layers of token pattern matching and/or CRC signature checking is prepared by the detection data processor 52 (step 25), and the detection regimen is converted to a binary format representing viral code detection data. The viral code detection data is stored in the code detection module 57 (step 27).

Thus, the viral code detection data may include multiple layers of tests. Each of the tests may be specified as a token pattern match methodology or a CRC signature check or a combination of token pattern match and CRC signature check methodologies. For a CRC check, the CRC signature of the viral code or some portion of the code may be specified as viral code detection data.

The following is an example of a pattern match methodology corresponding to identifying characteristics of a sample viral code which corrupts system macros:
  (a) search for a pattern p1 corresponding to access to a system macro; and
  (b) if pattern p1 is found in (a), search for one or more patterns corresponding to modification, replacement or deletion of the system macro.

A pattern match may be represented, in accordance with one embodiment, as DFA data. The pattern match DFA data, similar to DFA data corresponding to the script language definitions, include a set of states. Each state corresponds to a stage in the pattern match operations and includes a corresponding set of possible transitions from the state. Each transition from the state includes a character (or string of characters) to be matched and a corresponding next state to transition to if the character/string is matched. A state that is the final state for a pattern match has an output token (rather than an associated set of transitions from the state) which indicates that the corresponding pattern has been matched.

Detection of Viral Code Using Lexical Analysis

The file to be scanned, which may be stored on a storage medium, such as hard disk or floppy disk, or received via a network, such as the Internet, or a wired or wireless transmission medium, such as telephone landlines or RF airwaves, is converted to a data stream. The data stream may include characters [such as digits in a number (e.g., "0", "8", etc.), letters (e.g., "e", "q", etc.), symbols (e.g., "+", ";", ">", etc.)] in the file to be scanned.

The language description data provided by language description module 55 and the viral code detection data provided by code detection module 57 are used by detection engine 53 to analyze lexically the data stream and decide if the data stream contains viral code. Pattern matching, pattern searching and/or virus or CRC signature checking operations may be performed on the data stream to search for and detect one or more polymorphic script language viruses.

For a data stream, a detection engine goes through each entry in the code detection module 57. The code detection module 57 has separate entries for the respective viruses targeted for detection. Each virus detection entry may have one or more pattern matches and/or CRC signature checks.

The data stream, in an embodiment in which the target script languages are defined by pattern matching rules and the patterns are associated with output tokens (described above), may be converted to a stream of tokens. The tokens may correspond to respective language constructs, and each token may be a corresponding unique number, symbol, etc. A detection process in that embodiment includes two stages: (i) tokenize the data stream; and (ii) process the tokens using the detection data.

Figure 6:
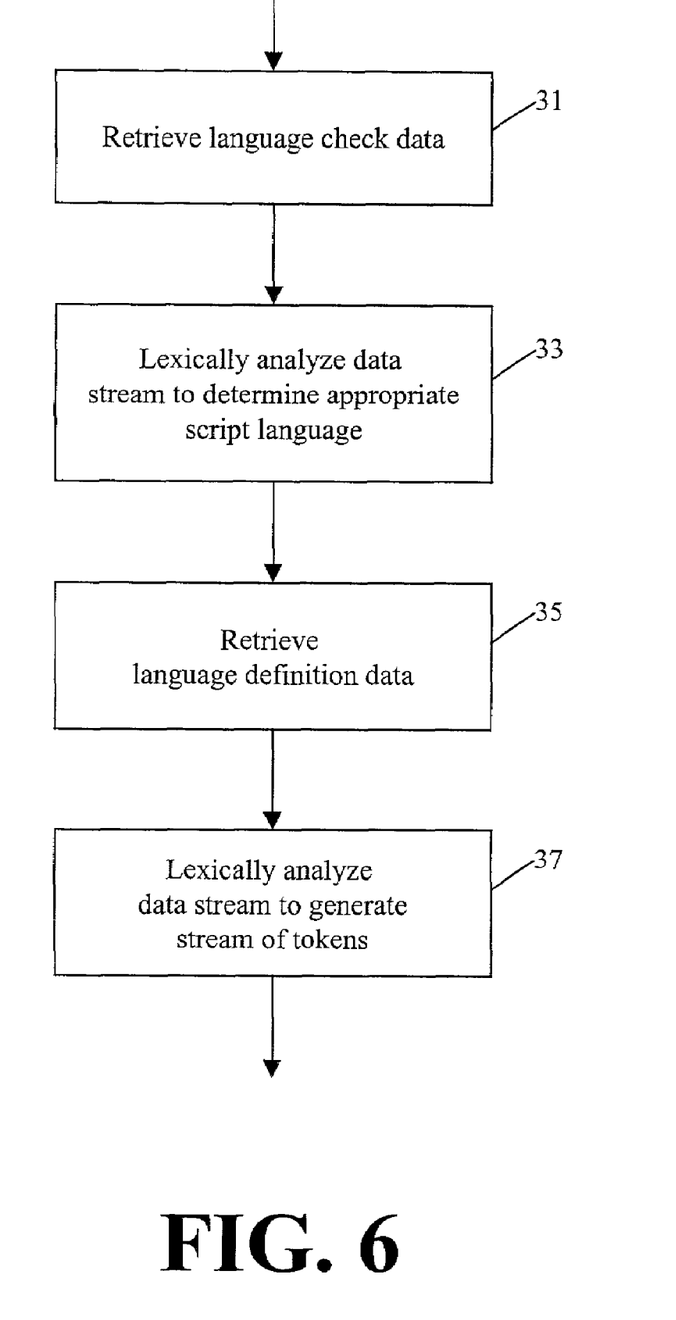
FIG. 6 shows a flow chart of a process for generating a stream of tokens, in accordance with an embodiment of the present disclosure.

An exemplary process for tokenizing a data stream will be described with reference to FIGS. 2 and 6. The detection engine 53 retrieves the language check data from language description module 55 (step 31) and uses the language check data to lexically analyze the data stream to determine the appropriate script language (step 33). The language definition data for the script language determined in step 53 is retrieved from language description module 55 (step 35). Using the language definition data retrieved in step 35, the data stream is again lexically analyzed to generate a stream of tokens (step 37).

The data stream corresponding to a file to scan is tokenized by lexical analysis. The data stream is fed to a lexical analyzer (not shown) in the detection engine which generates a stream of tokens. To tokenize the data stream, a script language used in the data stream is determined using the language check data. The data stream is analyzed using the language check data to select the language definition data to use for the detection process. Next, the selected language definition data and the data stream are supplied to the lexical analyzer. The data stream is lexically analyzed again, this time using the language definition data, to generate a stream of tokens. As mentioned above, each generated token corresponds to a specific language construct, and may be a corresponding unique number or character.

The lexical analyzer starts from an initialized static state 0. It retrieves the next character from the data stream and checks if the character matches any of the entries in a current state transition table retrieved from the language definition data corresponding to the current state. If there is a match, the lexical analyzer moves to the next state of the matched transition entry. If there is no match between the character being processed and the state transition table entries for the current state, the lexical analyzer returns to static state 0 and retrieves the next character from the data stream. The next state of the matched transition entry may be a final state with an output token, as described above. When a final state, which has an output token rather than a next state, is encountered, a pattern has been matched and the token is output.

As discussed above, the code detection module 57 may include multiple entries, with each entry corresponding to one or more pattern matches and/or CRC signature checks to be performed in sequence for detection of a corresponding virus. The detection engine 53 retrieves the entries of detection data in turn and performs the pattern match or CRC signature check corresponding to the retrieved detection entry, until a match is found. Depending on the data in the selected detection entry, a pattern match or CRC check on the generated token stream is attempted. If there is a match, viral code has been detected.

Figure 7:
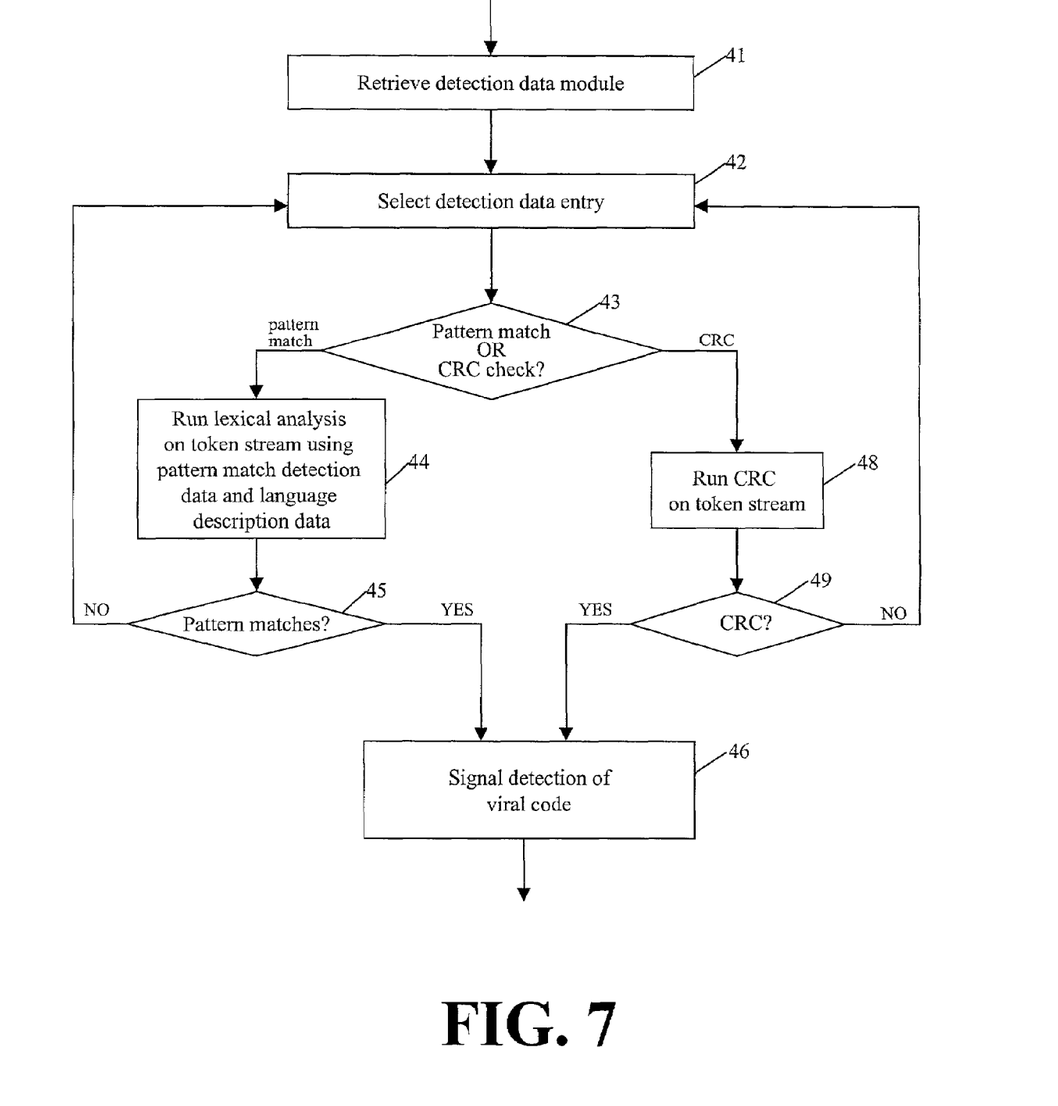
FIG. 7 shows a flow chart of a method of detecting a script language virus, in accordance with another embodiment of the present disclosure.

An exemplary method for detecting a script language virus will be described with reference to FIGS. 2 and 7. Initially, detection data stored in the code detection module 57 is retrieved (step 41). One of the detection data entries is selected (step 42) and the pattern match or CRC signature check in the selected entry are performed in turn. In step 43, it is determined whether a selected check is a pattern match or virus or CRC signature check. If the check is a pattern match, the token stream is analyzed lexically using the pattern match detection data and language description data (step 44). In step 45, it is determined whether there is a pattern match. If it is determined in step 43 that the check is a CRC signature check, the CRC is run on the token stream (step 48). In step 49, it is determined whether the CRC check succeeds. If the pattern match in step 44 or the CRC check in step 48 is not successful, then the method returns to step 42 to select another detection data entry. If it is successful, detection of viral code is signaled (step 46).

The apparatus and methods described above (including the associated data and rules) may be embodied in a computer program (or some unit of code) stored on/in computer readable medium, such as memory, hard drive or removable storage media. The apparatus and methods also may be in the form of a computer data signal, in one or more segments, embodied in a transmission medium, such as the Internet, an intranet, or another (wired or wireless) transmission medium. The present disclosure also encompasses, of course, execution of the computer program stored on/in a program storage device in a computing device/system, such as, for example, shown in FIG. 1.

The script language virus detection methodologies described herein may be performed by a computer in one or a combination of the following circumstances. The script language virus detection methodologies may be performed periodically (e.g., once/twice per day) or at selected times (e.g., each time the computer is powered up or restarted) by the computer on all relevant electronic files. In addition, the script language virus detection methodologies may be performed on a file (or a data stream received by the computer through a network) before the file is stored/copied/executed/opened on the computer.

The above specific embodiments are illustrative, and many variations can be introduced on these embodiments without departing from the spirit of the disclosure or from the scope of the appended claims. Elements and/or features of different illustrative embodiments may be combined with each other and/or substituted for each other within the scope of this disclosure and appended claims.

For example, as suggested above, a rule-based approach may be used for script language detection. The above-described methods and devices may be integrated with other artificial intelligence techniques. For example, a rule-based viral code detection module may include a learning component. When the script language virus detector determines that a data stream includes viral code, the positive identification of viral code may be fed back to the learning component for fortifying the rules in the rule base and/or adding additional rules.

Additional variations may be apparent to one of ordinary skill in the art from reading the following U.S. provisional applications, which are incorporated herein by reference:

(a) Ser. No. 60/218,488, filed Jul. 14, 2000 and entitled "DETECTION OF A CLASS OF MALICIOUS CODE";

(b) Ser. No. 60/218,333, filed Jul. 14, 2000 and entitled "DETECTION OF SUSPICIOUS PRIVILEGED ACCESS TO RESTRICTED COMPUTER RESOURCES";

(c) Ser. No. 60/218,926, filed Jul. 14, 2000 and entitled "DETECTION OF DECRYPTION TO IDENTIFY ENCRYPTED VIRUS";

(d) Ser. No. 60/218,922, filed Jul. 14, 2000 and entitled "DETECTION OF POLYMORPHIC VIRUS CODE USING DATAFLOW ANALYSIS";

(e) Ser. No. 60/218,467, filed Jul. 14, 2000 and entitled "DETECTION OF MALICIOUS CODE USING EMULATION OF OPERATING SYSTEM FUNCTIONS"; and (f) Ser. No. 60/218,313, filed Jul. 14, 2000 and entitled "DETECTION OF POLYMORPHIC SCRIPT LANGUAGE VIRUSES BY DATA DRIVEN LEXICAL ANALYSIS".

What is claimed is:

1. A method of detecting script language viruses in data streams comprising:
    using a processor for:
    preparing language description data corresponding to at least one script language; preparing detection data for viral code corresponding to a script language virus; lexically analyzing a data stream to identify the at least one script language;
    lexically analyzing the data stream using the language description data to generate a stream of tokens;
    generating viral code detection data by analyzing a plurality of samples of polymorphic script language viral code; and
    lexically analyzing the stream of tokens using the detection data and the language description data to identify the script language virus.

2. The method of claim 1, wherein the language description data correspond to Dynamic Finite Automata data.

3. The method of claim 2, wherein the Dynamic Finite Automata data comprises a set of states, with each state having a corresponding set of transaction having an associated character to be matched and an associated next state.

4. The method of claim 1, wherein the language description data correspond to language definition rules and check rules, wherein the language definition rules include descriptions of constructs of the target script language and relationships between the constructs.

5. The method of claim 4, wherein the lexical analysis includes one or more pattern matches based on the language definition rules.

6. The method of claim 4, wherein a script language used by the data stream is determined by the lexical analysis using the language check rules.

7. The method of claim 1 further comprising setting language definition rules for each of the least one script language.

8. The method of claim 1, wherein the detection data comprise at least one test, wherein each of the at least one test correspond to a pattern match or a cyclical redundancy check.

9. The method of claim 1, wherein the step of preparing detection data comprises:
    obtaining samples of the viral code;
    analyzing the obtained samples; and
    setting a detection regimen that includes at least one pattern match or cyclical redundancy check based on the analysis of the obtained samples.

10. The method of claim 1, wherein the data stream is converted to a stream of tokens using lexical analysis.

11. The method of claim 10, wherein the tokens correspond to respective language constructs.

12. The method of claim 10, wherein a cyclical redundancy check is performed on the stream of tokens to detect viral code.

13. A program storage device readable by a machine, tangibly embodying a program of instructions executable by the machine to perform method steps for detecting script language viruses, the method steps comprising:
    preparing language description data corresponding to at least one script language; preparing detection data for viral code corresponding to a script language virus; lexically analyzing a data stream to identify the at least one script language;
    lexically analyzing the data stream using the language description data to generate a stream of tokens;
    generating viral code detection data by analyzing a plurality of samples of polymorphic script language viral code; and
    lexically analyzing the stream of tokens using the detection data and the language description data to identify the script language virus.

14. A computer system, comprising: a processor; and
    a program storage device readable by the computer system, tangibly embodying a program of instructions executable by the processor to perform method steps for detecting script language viruses, the method steps comprising:

preparing language description data corresponding to at least one script language; preparing detection data for viral code corresponding to a script language virus; and lexically analyzing a data stream to identify the at least one script language;

lexically analyzing the data stream using the language description data to generate a stream of tokens;

generating viral code detection data by analyzing a plurality of samples of polymorphic script language viral code; and lexically analyzing the stream of tokens using the detection data and the language description data to identify the script language virus.

15. An apparatus for detecting script language viruses, comprising:

a script language processor, wherein the script language processor prepares language description data corresponding to at least one script language;

a detection data processor, wherein the detection data processor prepares detection data for viral code corresponding to a script language virus and wherein the detection data processor generates viral code detection data by analyzing a plurality of samples of polymorphic script language viral code; and a detection engine, wherein the detection engine converts a data stream to a stream of tokens using lexical analysis, wherein the tokens correspond to respective language constructs, wherein the detection engine lexically analyzes the stream of tokens using the language description data and the detection data to identify the script language virus.

16. The apparatus of claim 15, wherein the language description data correspond to Dynamic Finite Automata data.

17. The apparatus of claim 16, wherein the Dynamic Finite Automata data comprises at least one set of states, with each state having a corresponding set of transitions and each transition having an associated character to be matched and an associated next state.

18. The apparatus of claim 15, wherein the language description data corresponds to language definition rules and language check rules, wherein the language definition rules include descriptions of constructs of the target script language and relationships between the constructs.

19. The apparatus of claim 18, wherein the lexical analysis by the detection engine includes one or more pattern matches based on the language definition rules.

20. The apparatus of claim 18, wherein a script language used by the data stream is determined by the lexical analysis of the detection engine using the language check rules.

21. The apparatus of claim 15, wherein the detection data comprises at least one test, and each of the at least one test correspond to a pattern match or a cyclical redundancy check.

22. A method, comprising:

using a processor for:

receiving a data stream;

lexically analyzing the data stream to identify a script language; receiving language description data for the script language;

lexically analyzing the data stream using the language description data to generate a stream of tokens;

generating viral code detection data by analyzing a plurality of samples of polymorphic script language viral code; and lexically analyzing the stream of tokens using the viral code detection data and the language description data to identify at least one script language virus.

* * * * *

UNITED STATES PATENT AND TRADEMARK OFFICE
CERTIFICATE OF CORRECTION

PATENT NO. : 7,636,945 B2 Page 1 of 1
APPLICATION NO. : 09/905343
DATED : December 22, 2009
INVENTOR(S) : Chandnani et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1535 days.

Signed and Sealed this

Ninth Day of November, 2010

David J. Kappos
*Director of the United States Patent and Trademark Office*